United States Patent [19]

Ingraffea

[11] 4,381,278

[45] Apr. 26, 1983

[54] METHOD FOR FORMING A COATED PAPERBOARD CONTAINER

[75] Inventor: Dominic D. Ingraffea, Ringwood, N.J.

[73] Assignee: James River-Dixie/Northern, Inc., Greenwich, Conn.

[21] Appl. No.: 331,507

[22] Filed: Dec. 16, 1981

Related U.S. Application Data

[60] Continuation of Ser. No. 208,624, Nov. 20, 1980, abandoned, which is a continuation of Ser. No. 65,581, Aug. 10, 1979, abandoned, which is a division of Ser. No. 968,014, Dec. 11, 1978, abandoned.

[51] Int. Cl.$^3$ .............................................. B29C 17/04
[52] U.S. Cl. .................................... 264/512; 264/544; 264/550; 425/387.1
[58] Field of Search ........ 264/510, 512, 544, 549–551; 425/384, 387.1, 388

[56] References Cited

U.S. PATENT DOCUMENTS

| | | | |
|---|---|---|---|
| 3,173,174 | 3/1965 | Edwards | 425/387.1 X |
| 3,321,562 | 5/1967 | Wanderer | 264/550 |
| 3,357,053 | 12/1967 | Lyon et al. | 264/550 X |
| 3,933,562 | 1/1976 | Cruckshank et al. | 264/550 X |
| 4,026,458 | 5/1977 | Morris et al. | 229/30 |
| 4,149,841 | 4/1979 | Patterson | 425/387.1 X |

*Primary Examiner*—Jan H. Silbaugh
*Attorney, Agent, or Firm*—Harry W. Hargis, III

[57] ABSTRACT

A method for forming a deep drawn paperboard container coated with a layer of grease and water impermeable polymeric material. A paperboard blank is disposed between and acted upon by a heated mandrel and a heated mold to form a container. The surface of the blank engageable by the mandrel bears the polymeric coating, and means are operative relatively to move the mandrel and mold toward one another, to engage, the blank, and, just prior to fully engaging the blank to set the same, to introduce a film of air between the heated mandrel and the polymer coated surface to ensure against sticking of the coating to the mandrel.

19 Claims, 6 Drawing Figures

METHOD FOR FORMING A COATED PAPERBOARD CONTAINER

This is a continuation, of application Ser. No. 208,624, filed Nov. 20, 1980 now abandoned, which is a continuation of Ser. No. 065,581, filed Aug. 10, 1979, now abandoned which is a division of Ser. No. 968,014 filed Dec. 11, 1978 and now abandoned.

BACKGROUND OF THE INVENTION

This invention relates to containers, and more particularly to improved method for forming deep drawn containers from paperboard. While of broader applicability, the invention is directed to improvements in forming paperboard containers having liquid impermeable surface coatings.

In the molding of containers from paperboard blanks coated with liquid impermeable materials such as, for example, polymeric materials, efforts at preventing sticking of such coatings to heated elements of the mold structure have involved use of release agents, such as, for example, silicone. Materials of this type, however, add to the cost of the raw materials, and, in amounts required to be effective, are not compatible with food and drug laws. Also, coatings of polytetrafluoroethylene, available under the trademark "Teflon", have been applied to the surfaces of the mold structure to prevent sticking, but tend to break down and become ineffective after short periods of usage.

U.S. Pat. No. 4,026,458, believed material to the examination of this application, teaches deep drawing a polymer coated paperboard container of the hereinabove mentioned type from a coated paperboard blank. The blank is disposed between heated mandrel and mold elements, and these elements are moved toward one another to form and set the container. Application of heat ensures setting of the paperboard blank so that it will not revert to its flattened mode. To avoid sticking of the heated mandrel to the coating, the temperature of the mandrel is maintained at a lower, non-sticking temperature than the temperature of the mold. For example, the mandrel is maintained below about 195° F. while the mold is maintained at between 200° F. to 350° F. It has been found, however, that this lower temperature of the mandrel does not always ensure adequate setting of the paperbord fibers to achieve dimensional stability in the finished container.

It is a general objective of this invention to provide improved method for forming a coated paperboard container that consistently achieves full setting of the fibers without damage to the coating.

SUMMARY OF THE INVENTION

In achievement of the foregoing as well as other objectives and advantages, the invention contemplates improved method for forming a drawn paperboard container having at least one side coated with a layer of heat degradable, liquid impermeable material, wherein a paperboard blank coated on at least one side is disposed between and engageable by heated mandrel and mold elements relatively movable toward one another to form a container, and introducing a film of compressible fluid between one of said mold elements and the recited one side of said blank immediately prior to fully engaging the blank to set the same, to ensure against degradation of the material of said coated layer.

The manner in which the foregoing objectives and advantages of the invention may best be achieved will be more fully understood from a consideration of the following description, taken in light of the accompanying drawing.

DESCRIPTION OF THE PREFERRED EMBODIMENT

Figure 1:
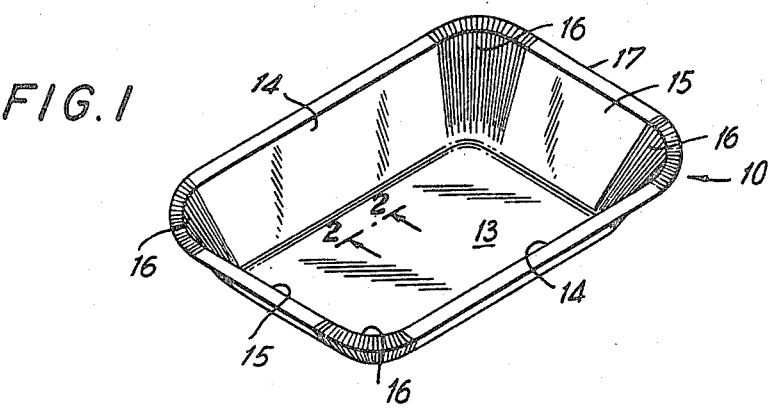
FIG. 1 is a perspective showing, on a reduced scale, of a coated paperboard container made according to the invention.
Figure 2:
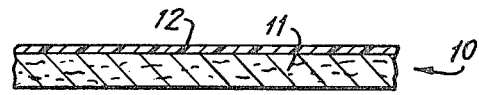
FIG. 2 is a fragmented sectional showing, on an enlarged scale, of the container taken along the line 2—2 in FIG. 1, and looking in the direction of arrows applied thereto.

With more detailed reference to the drawing, there is seen in FIGS. 1 and 2 a drawn container 10 of paperboard sheet 11, made from, for example, conventional bleached sulphate or sulphite pulps, or mixtures thereof, coated on its inner side with a layer 12 of water and grease resistant polymeric material, such as, for example polyester. A polyester found useful comprises polyethylene terephthalate (PET). Other materials suitable for coatings comprise polyethylene, polypropylene, polysulfone and polyamide. Preferably, although not necessarily, the paperboard sheet 11 is from about 18 point caliper to about 24 point caliper, and the layer 12 of polyester coating is from about 1 mil to about 1.5 mils thick. The container is of generally rectangular configuration, comprising a bottom wall 13, side and end walls 14 and 15, respectively, flaring outwardly therefrom. Walls 14 and 15 are joined at corners by curved walls 16, and terminate in a peripherpal flange 17.

Figure 3:
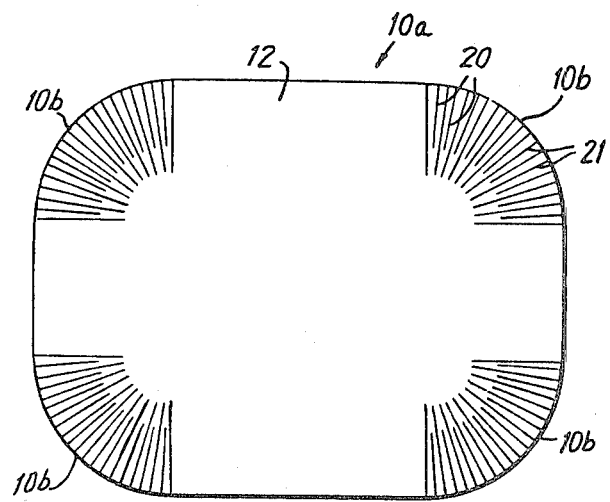
FIG. 3 is a top plan view of a coated paperboard blank from which the container seen in FIG. 1 is made.

In FIG. 3 there is seen a coated paperboard blank 10a from which container 10 is molded. The blank 10a is of substantially rectangular configuration with arcuate corners 10b. It is of course to be understood that other configurations, such as, for example, square or circular, are contemplated by the invention. The illustrated side of blank 10a is provided with the coating layer 12, and the same side is provided at the corners with spaced, radially extending short score lines 20 and long score lines 21, disposed in alternate sequence. It is the protection of coating layer 12, during molding of the container 10 from blank 10a, to which the invention is particularly directed. The score lines 20 and 21 advantageously are disposed and adapted, and as will be more fully appreciated from what follows, to accommodate flow of excess paperboard into the small spaces defined by the score lines in provision of relatively smooth pleatings in curved corners 16 and corner portions of flange 17.

Figure 4:
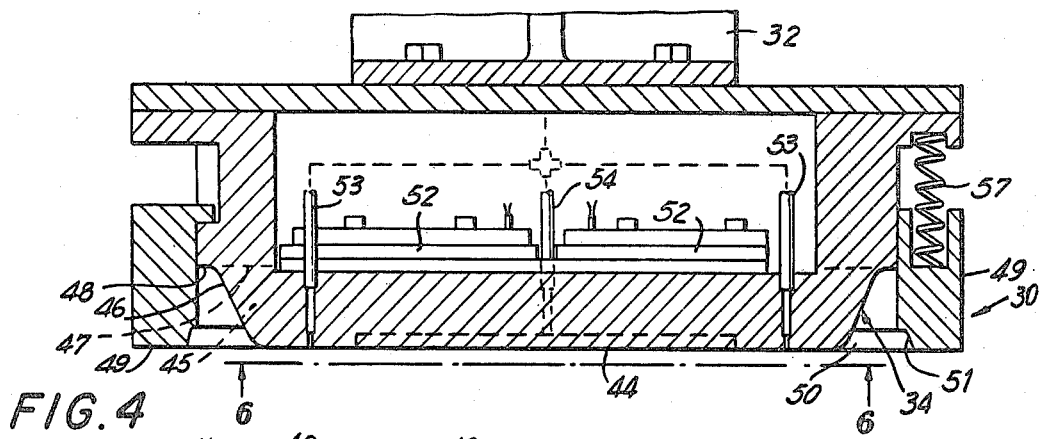
FIG. 4 is a fragmented sectional view, in elevation, of retracted mandrel and mold structure embodying apparatus aspects of the invention.

With reference to FIG. 4, there is seen an improved apparatus 30 for forming containers 10, and comprising frame structure provided with a bed 31 and a plunger 32 mounted on suitable known means (not shown) for reciprocable movements toward and away from bed 31. A mold 33 is supported on bed 31 and a mandrel 34 is supported on plunger 32 for coaction with mold 33.

Further to the structure of mold 33, a ring 35 mounted on the underside of the mold clamps an electrical resistance heating element 36 of generally annular configuration in high heat exchange relationship with mold 33. A knockout 37 is provided in mold 33, and comprises a flat, container-engaging member 38 having its face, in extended position, flush with the upper rim 39 of the mold 33. The mold 33 further includes upwardly extending, outwardly divergent side and end walls 40 and 41 respectively, terminating in respective downturned, curved rim portions 42 and 43. It is to be noted that the contour of the mold as thus far described corresponds substantially to the lower, outer contour of container 10 as seen in FIG. 1. A pressure ring 58 is disposed about mold 33, and is urged into extended position by suitably positioned springs, one of which is seen at 59.

Further to the construction of mandrel 34, ram 32, and associated elements, the mandrel includes a central flat rectangular wall 44 parallel with the bottom surface of mold 33. Side and end walls 45 and 46, respectively, extend upwardly and diverge outwardly from wall 44, and terminate in curved sections, 47 and 48 respectively. A pressure ring 49 is disposed about mandrel sections 47, 48, and includes curved, grooved surfaces 50 and 51 that in essence are extensions of curved sections 47 and 48. Ring 49 is resiliently mounted by springs on mandrel 34, one of which is seen at 57, and is movable relative to the mandrel between an extended position in which its grooves 50 and 51 clamp the edges of a blank 10a against curved surfaces 47 and 48 upon engagement of the blank by the mandrel, and a retracted position to be described. A pair of electrical resistance heating elements 52 are disposed in high heat exchange relation with mandrel 34.

Figure 5:
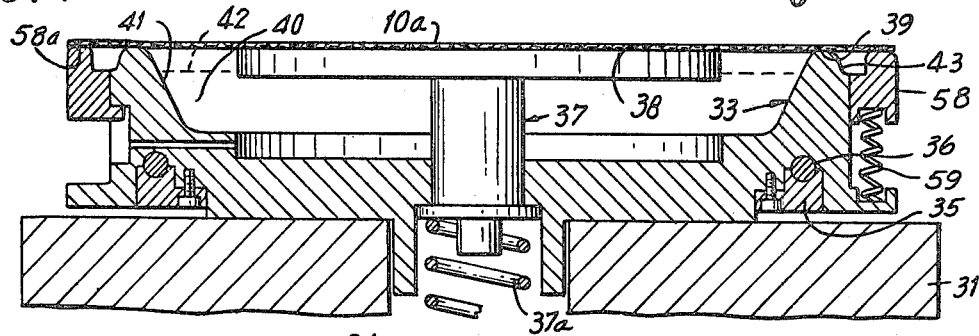
FIG. 5 is an enlarged sectional showing of a portion of the apparatus seen in FIG. 4, and illustrating engaged mandrel and mold structure.
Figure 5:
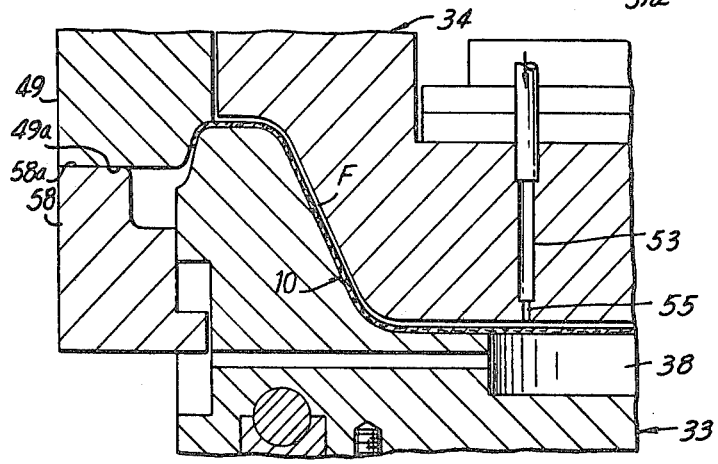
Figure 6:
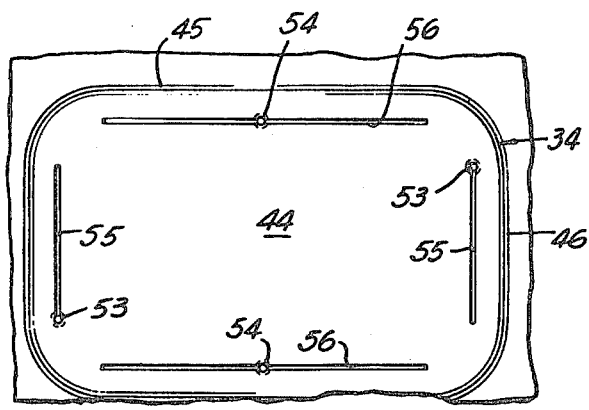
FIG. 6 is a view of a portion of the apparatus shown in FIG. 1, as seen looking in the direction of arrows 6—6 applied thereto.

Further to the construction of mandrel 34, supply conduits 53 and 54 for a compressible fluid, such as air, for example, extend therethrough, and, as seen further to advantage in FIG. 6, terminate in elongate slots 55, 56, respectively, that extend generally parallel to the edges of the mandrel. Slots 55 and 56 are dimensioned to be restrictive to air flow, permitting sufficient air discharge to produce a film of air between the mandrel 34 and the coated side of a blank 10a upon substantially full engagement of the blank by the mandrel and mold, for reasons to be described in what follows, and in connection with FIG. 5.

Considering now operation of the apparatus in more detail, in a retracted position of mandrel 34, as is illustrated in FIG. 4, pressure ring 49 is in its extended position, as respects the mandrel, under the urging of mounting springs 57. Also, pressure ring 58 is in its extended position, under the urging of springs 59. While the mandrel is in retracted position, a paperboard blank 10a is placed over mold 33 with its polymer coated side facing the mandrel and portions of its lower surface resting on knockout plate 37, on rim 39 of the mold, and on a flat surface 58a of lower pressure ring 58. Heating elements 36 and 52 are energized, under control of known suitable thermostatic means (not shown), to maintain substantially identical temperatures of the mandrel and mold, preferably in the range from about 200° F. to about 350° F.

With blank 10a in place, heated mandrel 34 is moved by plunger 32 toward the blank and mold 33, whereupon the upper and lower peripheral surfaces of the blank are clamped between a flat surface 49a of ring 49 and flat surface 58a of ring 58, frictionally to retain the blank in place for engagement by mandrel 34. As plunger 32 continues its downward movement, mandrel 34 engages the central portion of the blank and continues downwardly all the while urging it toward conformity with mold 33 and with retracted knockout plate 38, to its outside, and toward conformity with mandrel 34, to its inside. Also, pressure ring 49 engages the periphery of the blank and urges it against the downturned rim 42, 43 further to retain the blank and to form peripheral flange 17. Downward movement of the mandrel is accommodated by resilient mountings of rings 49 and 58 on their respective springs 57 and 59.

As mandrel 34 is moved to within 1/16 inch of full closing while blank 10a is engaged, pressurized air from a known, suitably controlled source (not shown) is introduced to conduits 53, 54 for flow through slots 55 and 56 to the space between the mandrel and the coated side of the blank. With the aid of the air sealing effect derived from clamping the blank between ring 49 and rim 42, 43, the air is confined in the described space in the form of a film, designated generally by the letter F, adequately to function as a protective thermal barrier or cushion between mandrel 34 and the coating layer 12, while accommodating transfer of sufficient heat from mandrel 34 to coact with heat from mold 33 to set the shaped container 10 in the fully closed position of the mandrel shown in FIG. 5. Presence of the confined film of air prevents coating layer 12 from adhering or sticking to the mandrel surface, and assures a quick release as the mandrel is retracted from closed position and the container is ejected by plate 38 of knockout 37. To facilitate the drawing operation, and in accordance with usual practice, the blank engaging surfaces of both mandrel 33 and mold 34 are chromium plated.

From the foregoing, it will be appreciated that the invention affords an improved molding method useful in damage-free formation of containers lined with protective coatings from paperboard blanks bearing such coatings.

While preferred embodiments and practices have been described, it is to be understood that the invention is susceptible of such modifications as may fall within the scope of the appended claims.

I claim:

1. A method of deep drawing a container from a paperboard blank having a layer of polymeric material on at least one side thereof, comprising the steps of: providing a female mold and a mandrel having the shape of the outside and inside, respectively, of said container, and movable between an open position and a blank forming closed position; disposing said blank between said female mold and said mandrel in said open position thereof, so that said side having said layer is presented toward said mandrel; heating said female mold and said mandrel to temperatures in a range of from about 200° F. to about 350° F., said temperatures being sufficient to set the paperboard blank and capable of damaging said layer; relatively moving said heated female mold and said heated mandrel toward another into the recited closed position thereof to engage said blank and urge the latter into conformity with said female mold and said mandrel; and, just prior to movement to the recited closed position of said female mold and said mandrel, introducing and confining a film of compressible fluid between said mandrel and said side of said blank and said layer to ensure against damage to the latter by said heated mandrel.

2. The method of claim 1, wherein said layer of polymeric material is from about 1 mil to about 1.5 mils thick, and said paperboard is from about 18 point caliper to about 24 point caliper.

3. The method of claim 1 or 2, wherein said polymeric material is selected from the group consisting of polyester, polyamide, polypropylene, polyethylene, and polysulfone.

4. The method of claim 3, wherein said compressible fluid is introduced as recited upon relative movement of said female mold and said mandrel to within about 1/16 inch of said closed position.

5. The method of claim 3, wherein said compressible fluid is air.

6. The method of claim 5, wherein said compressible fluid is introduced as recited upon relative movement of said female mold and said mandrel to within about 1/16 inch of said closed position.

7. A method of deep drawing a container from a paperboard blank having a layer of polymeric material on at least one side thereof, comprising the steps of: providing a female mold and a mandrel having the shape of the outside and inside, respectively, of said container, and movable between an open position and a blank forming closed position; disposing said blank between said female mold and said mandrel in said open position thereof, so that said side having said layer is presented toward said mandrel; heating said female mold and said mandrel to substantially the same temperature in a range of from about 200° F. to about 350° F., said temperature being sufficient to set the paperboard blank and capable of damaging said layer; relatively moving said heated female mold and said heated mandrel toward one another into the recited closed position thereof to engage said blank and urge the latter into conformity with said female mold and said mandrel; and, just prior to movement to the recited closed position of said female mold and said mandrel, introducing and confining a film of compressible fluid between said mandrel and said side of said blank and said layer to ensure against damage to the latter by said heated mandrel.

8. The method of claim 7, wherein said layer of polymeric material is from about 1 mil to about 1.5 mils thick, and said paperboard is from about 18 point caliper to about 24 point caliper.

9. The method of claim 7 or 8, wherein said polymeric material is selected from the group consisting of polyester, polyamide, polypropylene, polyethylene, and polysulfone.

10. The method of claim 9, wherein said compressible fluid is introduced as recited upon relative movement of said female mold and said mandrel to within about 1/16 inch of said closed position.

11. The method of claim 9, wherein said compressible fluid is air.

12. The method of claim 11, wherein said compressible fluid is introduced as recited upon relative movement of said female mold and said mandrel to within about 1/16 inch of said closed position.

13. A method of deep drawing a paperboard container, comprising: providing a female mold and a mandrel operative for engagement with one another in a closed disposition thereof; providing a paperboard container blank having a layer of liquid impermeable material on at least one side thereof, said material comprising a polymer coating selected from the group consisting of polyester, polyamide, polypropylene, polyethylene, and polysulfone; disposing said blank between said female mold and said mandrel so that said side having said layer is presented toward said mandrel; heating said female mold and said mandrel to substantially the same temperature in a range from about 200° F. to about 350° F., said temperature being sufficient to set the paperboard blank; relatively moving said female mold and said mandrel toward one another into the recited closed disposition thereof to engage said blank and urge the latter into conformity with said female mold and said mandrel; and, just prior to movement to the recited closed disposition of said female mold and said mandrel, introducing and confining a film of compressible fluid between said mandrel and said side of said blank having said layer.

14. The method of claim 13, wherein said polymer coating is from about 1 mil to about 1.5 mils thick, and said paperboard is from about 18 point caliper to about 24 point caliper.

15. The method of claim 13 or 14, wherein said compressible fluid is introduced as recited upon relative movement of said female mold and said mandrel to within 1/16 inch of said closed disposition thereof.

16. The method of claim 13 or 14, wherein said compressible fluid is air.

17. The method of claim 16, wherein said compressible fluid is introduced as recited upon relative movement of said female mold and said mandrel to within 1/16 inch of said closed disposition thereof.

18. The method of claim 1, 7 or 13, wherein said blank is placed over said female mold, and said mandrel alone is moved from the recited open position toward said female mold into the recited blank forming closed position of said female mold and said mandrel.

19. The method of claim 18, wherein said compressible fluid is introduced as recited upon movement of said mandrel to within about 1/16 inch of closed position with said female mold.

* * * * *